May 30, 1961 P. C. MILLER, JR 2,986,487
METHODS FOR MAKING EVAPORATOR PLATES
Filed June 3, 1959
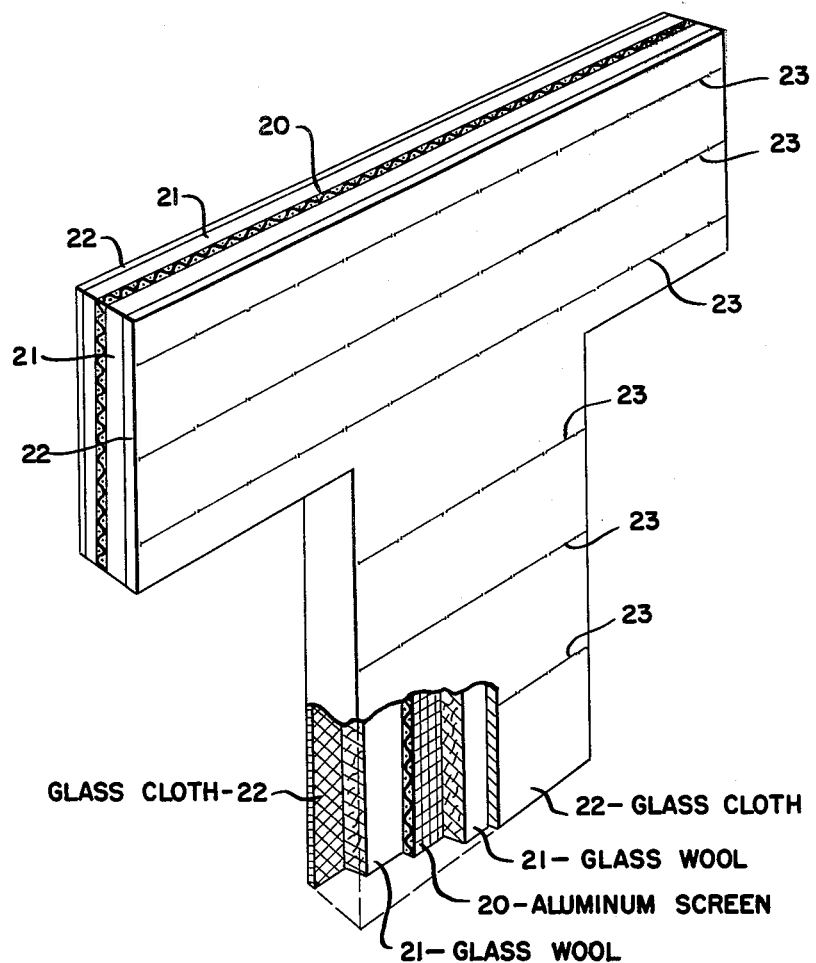
INVENTOR.
PAUL C. MILLER, JR.
BY
Cullen & Cantor
ATTORNEYS

United States Patent Office 2,986,487
Patented May 30, 1961

2,986,487

METHODS FOR MAKING EVAPORATOR PLATES

Paul C. Miller, Jr., Detroit, Mich., assignor to Fibercraft Products, Inc., Detroit, Mich.

Filed June 3, 1959, Ser. No. 817,768

10 Claims. (Cl. 154—119)

This application relates to a method of producing a laminate useful for producing evaporator plates, and particularly to usually T-shaped evaporator plates, such as are used in hot air furnace humidifiers or the like for the purposes of becoming saturated with water in pans of the humidifiers and evaporating such water by contact of the wetted plates with a moving stream of hot furnace air. This application is a continuation-in-part of my copending application Serial No. 673,221, filed July 22, 1957, now Patent Number 2,904,258, in which the claims are restricted to the laminated plate structure.

Evaporator plates for this purpose are old and well-known and it has been proposed to make such plates of a variety of materials such as ceramic, felt, fused glass wool, etc.

In this application, I disclose a novel method for forming the evaporator plate, composed of unfused glass fibers and a stiffening layer which does not destroy the flexible character of glass fiber, preferably a perforated metal body such as aluminum screening, and I disclose and claim here the novel process for fabricating such plate.

For an understanding of the plate hereof, and of the process for making it disclosed herein, reference should be had to the following specification which relates to the appended drawing.

In this drawing, the single figure is an enlarged scale perspective view of an evaporator plate of the invention.

Referring to the drawing, it will be observed that the evaporator plate hereof includes the following parts: 20, a screen of aluminum mesh; 21, two blankets of fibrous glass wool felted batting compressed from their original fluffiness to be a relatively thin blanket; 22, two outer facings of woven glass fiber cloth considerably thinner than the blankets; and 23, stitching of glass fiber thread.

*The screen.*—The screen 20 is of perforated metal, preferably of a metal which is rust and corrosion proof, such as aluminum mesh, such as fly screening, known to the trade as 18–14 mesh and of wire which may be in a preferred embodiment of 0.0018 inch thickness. Being of aluminum mesh, it will not corrode as quickly as ferrous metal screening when used in water pans of furnace humidifiers and likewise has a high enough melting point so as not to melt under the impact of hot furnace air.

Other materials, such as glass fiber, copper, and stainless steels have been considered by me but have been found to be inferior to aluminum from various aspects, such as cost, stability at high temperature or resistance to corrosion.

The aluminum mesh functions to rigidify the plate and also function to prevent shredding off of the edges of the plate. It also functions to interlock the stitching for increased effectiveness of such stitching.

In addition, the aluminum mesh furnishes a high degree of protection to the steel trays or water pans employed in conventional humidifiers. These are painted but not always is the paint secure and consequently such steel trays have exposed areas which have a tendency to rust and corrode in use. When the steel is exposed due to a break in the painting, and in aluminum mesh evaporator plate such as I have here disclosed is employed as the evaporator plate, the aluminum mesh sets up a galvanic action whereby the steel pan does not corrode, but the aluminum mesh, and thus the evaporator plate as a whole corrodes and becomes self sacrificing because the aluminum mesh, rather than the steel tray, would be corroded by such galvanic action. The aluminum mesh evaporator plate hereof is expendable because it is the preferred and accepted custom to replace evaporator plates yearly.

*The blankets.*—The blankets 21 are initially very thick, the assembly being about one inch thick soft fluffy blankets of fiber glass batting. At the outset, it is treated with a water dispersion of phenol-formaldehyde which functions as a plasticizer of resin. Such resin in the finished product is decomposed and driven off during the process of manufacture of the plate as here described leaving nothing more than the fiber glass blankets which, during the process, is considerably reduced in thickness, about one-sixteenth inch, as well as being considerably densified to the point where it is relatively thin, although of course, it is considerably thicker than the aluminum mesh 20 or the outer facings 22 to be described. In the main, it is these blankets that function as the water saturated portions of the plate and which function for evaporation.

*The facings.*—The facings 22 are of thin cloth woven of glass fibers or strands of threads and normally untreated. However, it is to be understood that in the normal processing and manufacture of glass cloth from glass threads a certain quantity of organic oil accumulates on the cloth during the weaving and the process of forming the plate hereof incorporates the decomposing and destruction of such oil so that the facings are left free of such oil when the plate is completed. The facings are extremely thin and considerably assist in the evaporator function of the plate whereby a plate made of blankets and facings with an aluminum mesh central screen is far more effective for evaporation than a plate made only of glass wool blankets. In addition, the facings are relatively smooth and thus do not shred in use and shipment and also have a considerably lesser tendency to become coated with dirt and bacteria in use and in handling than would be the case with plates made with blankets alone, and thus are far more satisfactory not only from the point of view of appearance and handling and customer impact, but also from the point of view of evaporation inasmuch as there is no dirt to clog up the evaporator pores of the plate.

While the facings are of extremely fine mesh woven cloth, it is to be observed that they are rough in the sense that they furnish an extremely large area for evaporation, considerably larger than would be the case with blankets of glass wool alone.

*The stitching.*—Threads 23, preferably of inorganic heat resistant fiber, such as glass fiber, are used as stitching and these threads interlock with the aluminum mesh screen 20 to give an improved mechanical securing of the parts together in an unlaminated plate. Because the threads are of glass fibers, they do not act galvanically in conjunction with aluminum mesh and also they do not rot or decompose in use and thus remain firm and unbroken for satisfactorily discharging the securing function during the handling and use of the plates.

*The process.*—The process comprises the following steps essentially. First, the parts 20, 21—21, 22—22 are placed together to form a multiple ply evaporator plate, with the thick blankets 21 containing a fair degree of saturation with a liquid plasticizer of heat setable and, ultimately, decomposable resin, such as the phenol-formaldehyde previously mentioned.

The plate formed of these plies is then subjected to heat and pressure sufficient to thermoset the resin and cause the plies to adhere and thus form a laminated plate. A pressure of 75 pounds per square foot applied for 90 seconds at 450° F. has been found satisfactory. The result of this step is to produce a semi-rigid board.

The blankets are initially about one inch thick and are reduced during the first heating step to a thickness of approximately one-sixteenth of an inch, or a reduction of 16 to one.

Such a board, of considerable area, and quite rigid, is then slitted into five inch strips, that width being the height of the evaporator plate from its lower edge to its upper edge.

Thereupon the five inch quite rigid strips are stitched along the stitch lines shown using glass threads 23 for such stitching and with the stitches passing through and interlocking to the aluminum mesh 20. The lines of stitching are parallel to the lower and upper edges of the five inch strips which form the lower and upper edges of the evaporator plate.

The threads used for stitching are of a specification as follows: 10,350 feet of thread per pound of weight with a tensile strength of 14.3 pounds per thread.

These five inch stitched rigid laminated strips are then baked in a baking oven sufficient to decompose the resin and evaporate it, and delaminate the plate, and likewise, sufficient to destroy organic components of the blankets and facings and also to decompose and destroy any oil that may have been accumulated on the facings during the weaving of the glass cloth. The result is to leave the blankets and the facings of glass only, without organic components. It has been found that a baking for four and a half hours at a temperature of 810° F. without pressure in a closed atmosphere is satisfactory for this purpose.

Thereupon, the five inch strips are die-cut out of the large laminated sheet into the shape shown, to form T-shaped evaporator plates.

While, in the final baking step, it has been found that four and a half hours at 810° F. is one example, other examples are as follows; a range of 700° to 900° F. at a time ranging from 10 hours down to three hours.

These temperatures are determined as follows: 900° F. is maximum; otherwise at high temperatures the aluminum mesh 20 begins to soften; 700° F. is minimum; otherwise an excessive time is required for the baking step. Experience has demonstrated that four and a half hours at 810° F., in a range of ten to three hours at 700° to 900° F. is most satisfactory.

During the stitching and die cutting steps, the stitching and die cutting operations tend to smooth out any puckering that is caused, as is often the case, by the expansion of the aluminum mesh 20 more than the glass blankets and facings during the heating in the thermosetting and laminating step, and in thhe baking or delaminating step.

The temperature in the laminating step as well in the final baking or delaminating step, should be low enough to minimize the puckering due to the greater expansion of the aluminum than of the glass so that the puckering is so little that it can be absorbed by the smoothening that takes place during the stitching and the die cutting steps. Thus, experience has demonstrated that while the stitching step and die cutting step will eliminate some or most and possibly all of the puckering that takes place during the prior heating steps of laminating and baking, experience will determine how much heating can be applied in these heating steps without heating excessively to cause excessive puckering, in an amount that cannot be eliminated by the smoothening that takes place in the stitching and die cutting steps which follow the heating steps.

The following example illustrates the practice of the process.

Example 1

One inch thick loose mattted fiber glass blankets or bats are assembled on opposite surfaces of 18–14 mesh, 0.0018 inch aluminum wire screen. Upon each outer face of the fiber glass bats are assembled sheets of thin woven glass cloth. The assembly is wet with a dilute novolak solution comprising a 10% commercial aqueous prepolymer of phenol-formaldehyde resin. The wetting is adequate to exude liquid under pressure and may be to saturation since the excess liquid resin is exuded in the pressure stage. The laminated assembly is then plated in a platen press under 75 pounds per square foot pressure and heated under that pressure for ninety seconds at 450° F. The laminate thereby sets to a thin stiff board of about one-eighth inch thickness (a total reduction of about 16 to 1). The board-like product is then sewed with glass stitches usually running parallel about two inches apart as shown in the drawing, the stitches extending through the product from surface to surface. The product is finally cut into five inch strips, usually parallel to the lines of the stitches and slit between stitching rows, each strip being cut into evaporator plate T's as shown in the drawing. Finally, the laminate is heated to destroy the thermoset binder. That heating step may be applied before cutting of the laminate into strips, it may be applied to the five inch strips, or to the T-shaped evaporator plates cut therefrom. For destruction of the binder, the laminate is placed in an oven and baked in a closed atmosphere for 4½ hours at 810° F. The binder, on removal of the laminate from the oven, and cooling, will be found to have been destroyed, and the loose flexible absorbent and normal fluffy character of the fiber glass will have returned, except that the glass fiber will have expanded against the outer sheet of fiber glass, resiliently pressing outward thereagainst. The entire laminated assembly, however, is retained in the compressed state by the stitches as the sole mechanical means for securely maintaining the laminated evaporator plate assembly.

*Advantages.*—While many of the advantages have previously been set forth, some of them will hereafter be described even at the risk of repetition.

An evaporator plate formed as described wets completely almost immediately upon immersion and tests have shown a complete wetting within 20 seconds after the dipping of the lower end of the evaporator plate into a water pan. This contrasts favorably with evaporator plates now known which require a considerably longer time for complete wetting.

Another way of stating the foregoing is to state that the evaporator plate here shown has a considerably higher degree of capillarity than is true of certain plates such as are now being used.

Still another advantage is the relatively low cost of evaporator plates made according to the foregoing description, the costs being considerably less than evaporator plates now known, considering the factors of quality and effectiveness.

The evaporator plates hereof are considerably lighter in weight than ceramic plates and thus cost considerably less for shipment.

The evaporator plates hereof are non-frangible and non-brittle and thus may be easily handled without breakage and this is an important factor in the shipment and replacement of evaporator plates.

The evaporator plate hereof, however, is rigid enough so as to be self-supporting in use. When the lower edges are rested on the upper edges of water pans, the evaporator plates hereof are rigid enough to maintain themselves free standing and not become limp in use to bend over.

The evaporator plates hereof are non-organic and consequently there is no possibility of bacteria action and rotting, as would be the case with typical felted wool material such as have been proposed.

While the evaporator plates hereof are smooth to the touch, and have a low degree of surface adhesion to floating dirt particles in the water pan and also to dirt and other particles in the hot furnace air, they are nevertheless rough surfaced sufficiently to give an exceptional high quality evaporating surface which gives a high degree of evaporation effectivenness for these plates.

The glass wool blankets of the evaporator plates hereof, being faced with cloth, will not shred or abrade in handling, shipment or use.

An exceptionally high quality mechanical interlock is provided between the glass threads of the stitching and the aluminum mesh screen 20 and this gives an exceptionally fine mechanical effect which holds the plies of the plates together, even over a long period of handling, shipment, and use in hot air furnaces. The threads are stitched through the screen and the screen is thus interlocked to the facings.

The evaporator plate hereof will not only be free of shredding on the faces due to the facings employed, but likewise will be free of shredding along the edges where the facings are not effective and this is assured by the presence of the aluminum screen 20 in the center of the plate.

The evaporator plate hereof has been found to function so satisfactorily for wetting that even under extreme conditions of evaporation, the plate will remain constantly wet, their ability to pick up water from the pan being considerably greater than the effect of hot furnace air from the typical furnace under typical forced air heating to remove water from the plates.

An evaporator plate presents a special problem in evaporation because of its T-shape which provides an inlet for water into the plate about ½ the area of the upper part as against the lower part with the upper part being the part that provides the greatest degree of evaporation. The T-shape of the evaporator plate is a shape that has been accepted by the art and is today standard in that art and that T-shape sets up a special problem of evaporation as against water feed to the plate because the evaporator area is about twice the water feed area and the plate hereof has been found to be an exceptionally fine solution to that special problem created by the T-shape demanded by the art.

As contrasted with ceramic plates, the evaporator plate hereof cannot become clogged by mineral deposits from the water because the glass fiber plate hereof has a considerably greated proportion of cells and pores than the ceramic plates of the art and hence the evaporator plate hereof will not clog so quickly and under normal conditions of use will function satisfactorily over several heating seasons.

It will be observed that the evaporator plate hereof is fibrous glass rather than fused glass and despite the two heating steps, laminating and final baking, the glass fibers remain in fibrous condition and at no time are fused to one another. The heating steps hereof are at sufficiently low temperatures and times so that the glass fibers do not fuse. Even the final baking step functions merely to decompose the organic components and release them in volatile form and delaminate the plate, and all this without fusing the glass fibers.

Fiber glass is far superior to felt for evaporator plates not only because of its greater resistance to bacteria and fungus action but also because of the impossibility of the fiber glass burning in a furnace. Cotton and wool felts and paper felts that have been proposed are not only subjected to bacterial and fungus action when used in furnaces, but also can burn and often do burn with possible danger and certainly with a complete destruction of the plate and its evaporator function.

While the plate hereof has been shown in planar form die cut from a sheet, it can if desired be formed by molding into curved and flexible shapes and irregular contours as desired, characteristics which are not found in evaporator plates that have been proposed to be made of fused glass or ceramic.

When the laminated board of large area is cut into five inch strips, the cutting lines are arranged on a 45° angle to the warp and woof of the facings to avoid shredding of these facings with the result that the stitch lines and edges of the die cut evaporator plate will be on 45° angles to the warp and woof of the facings in the finished product.

Now having described the evaporator plate hereof and its method of manufacture, reference should be had to the claims which follow.

I claim:

1. The method of forming a flexible laminated fibrous body comprising impregnating fiber glass bats with adhesive, assembling said bats upon opposite sides of a porous flexible stiffening layer, assembling outer layers of woven glass cloth upon each outer surface of said fiber glass bats, compressing the several layers into a compacted laminate to adhesively secure the laminated assembly in compacted form, mechanically further securing said assembly with stitches of glass fiber thread applied through the adhesively secured compressed laminated body from surface to surface, and then removing the adhesive from said mechanically secured body.

2. The method of producing a flexible laminated fibrous body comprising impregnating loose matted fiber glass bats with adhesive, assembling adhesive impregnated fiber glass bats upon opposite sides of a reinforcing layer together with an outer layer of woven glass cloth upon each outer surface of said fiber glass bats, compressing the assembled layers to compact the fiber glass bats into layers of substantially reduced thickness and adhesively secure the same in compacted position, mechanically securing the compacted assembly into an integral laminate by stitching with glass thread stitches extending from surface to surface, and then removing the adhesive.

3. The method of producing a flexible laminated fibrous body comprising assembling loose matted layers of fiber glass bats upon opposite sides of a fine mesh metallic screen, said fiber glass bats being impregnated with a thermosetting resin, mounting outer sheets of woven glass cloth over both matted fiber bat surfaces, heating and compressing the assembly to reduce the thickness to a small fraction of the original body and to set the resin therein and bond the assembly to the tightly compresesd form, mechanically stitching the resin set assembly with glass fiber thread to mechanically secure the same in compressed form and then heating the laminate sufficient to decompose the resinous binder material and to produce a flexible moisture absorbent mechanically bonded laminate.

4. The method of producing a flexible laminated fibrous evaporator plate comprising assembling loose matted layers of adhesive impregnated fiber glass bats upon opposite sides of a fine mesh metallic aluminum reinforcing screen together with an outer layer of woven glass cloth upon each outer surface of said fiber glass bats, compressing the assembled layers to compact the fiber glass bats and adhesively secure the same in compacted position of substantially reduced thickness, mechanically securing the compacted assembly into an integral laminate by stitching with glass thread stitches extending from surface to surface, and then removing the adhesive and cutting said laminate into T-shaped evaporator plates out of the laminate assembly thus formed.

5. The method of producing a flexible laminated fibrous evaporator plate comprising assembling loose matted layers of fiber glass bats upon opposite sides of a fine mesh metallic aluminum reinforcing screen, said fiber glass bats being impregnated with a thermosetting resin, mounting outer sheets of woven glass cloth over both matted fiber bat surfaces, heating and compressing the assembly to reduce the thickness to a small fraction of the original body and to set the resin therein and bond the assembly to the tightly compressed form, mechanically stitching the resin set assembly with glass fiber thread to mechanically secure the same in compressed form, then heating the laminate sufficient to decompose the resinous binder material and to produce a flexible moisture absorbent mechanically bonded laminate, and cutting said laminate into T-shaped evaporator plates out of the laminate assembly thus formed.

6. The method of producing a flexible laminated fibrous evaporator plate comprising assembling loose matted layers of fiber glass bats upon opposite sides of a fine mesh metallic aluminum reinforcing screen, said fiber glass bats being impregnated with a thermosetting resin, mounting outer sheets of woven glass cloth over both matted fiber bat surfaces, heating and compressing the assembly to reduce the thickness to a small fraction of the original body and to set the resin therein and bond the assembly to the tightly compressed form, mechanically stitching the resin set assembly with glass fiber thread to mechanically secure the same in compressed form, then heating the laminate sufficient to decompose the added resinous binder and any oil film residue coating upon the glass fiber resulting from the usual production of glass fiber and to produce a flexible glass fiber moisture absorbent mechanically bonded laminate, and cutting said laminate into T-shaped evaporator plates out of the laminate assembly thus formed.

7. The method of producing a flexible laminated fibrous body comprising impregnating loose matted fiber glass bats with adhesive, assembling layers of said bats upon opposite sides of a porous flexible stiffening layer, assembling outer layers of woven glass cloth upon each outer surface of said fiber glass bats, compressing the several assembled layers to compact the fiber glass bats and adhesively secure the several layers into a compacted laminate of substantially reduced thickness, stitching the compacted assembly with stitches of inorganic fiber extending from outer surface to outer surface to mechanically secure the assembly into an integral body and then removing the adhesive.

8. The method of producing a flexible laminated fibrous body comprising impregnating loose matted fiber glass bats with thermosetting adhesive, assembling layers of said bats upon opposite sides of a porous flexible stiffening layer, assembling outer layers of woven glass cloth upon each outer surface of said fiber glass bats, heating and compressing the several assembled layers to compact the fiber glass bats under conditions to set the adhesive and adhesively secure the assembly in compacted position of substantially reduced thickness, stitching the compacted assembly with stitches of glass fiber thread resistant to destruction at temperatures in the range of 700 to 900° F., extending from outer surface to outer surface to further mechanically secure the assembly into an integral body and then heating the laminate to a temperature in the range of 700 to 900° F. for a period of time sufficient to decompose the adhesive.

9. The method of producing a flexible laminated fibrous body comprising impregnating loosely matted fiber glass bats with thermosetting adhesive, assembling layers of said bats upon opposite sides of a porous flexible stiffening layer, assembling layers of woven glass upon each outer surface of said fiber glass bats, heating and compressing the several assembled layers to compact fiber glass bats under conditions to set the adhesive and adhesively secure the assembly in compacted position of substantially reduced thickness, stitching the compacted assembly with glass thread stitches extending from outer surface to outer surface to further mechanically secure the assembly into an integral body and then heating the laminated body for a period and at a temperature sufficient to decompose the adhesive.

10. The method as defined in claim 9 wherein the porous flexible reinforcing layer is a metal screen.

References Cited in the file of this patent
UNITED STATES PATENTS

| | | |
|---|---|---|
| 1,495,097 | Muus | May 20, 1924 |
| 2,258,100 | Reiss et al | Oct. 7, 1941 |
| 2,432,752 | Gray | Dec. 16, 1947 |
| 2,692,219 | Slayter et al. | Oct. 19, 1954 |
| 2,744,044 | Toulmin | May 1, 1956 |
| 2,887,154 | Morningstar et al. | May 19, 1959 |